May 30, 1933.   C. H. TOMLINSON   1,911,251
MEANS FOR CONNECTING COUPLED CARS IN A TRAIN LINE CIRCUIT
Original Filed Oct. 28, 1927   2 Sheets-Sheet 1

Inventor
CHARLES H. TOMLINSON
By
Attorney

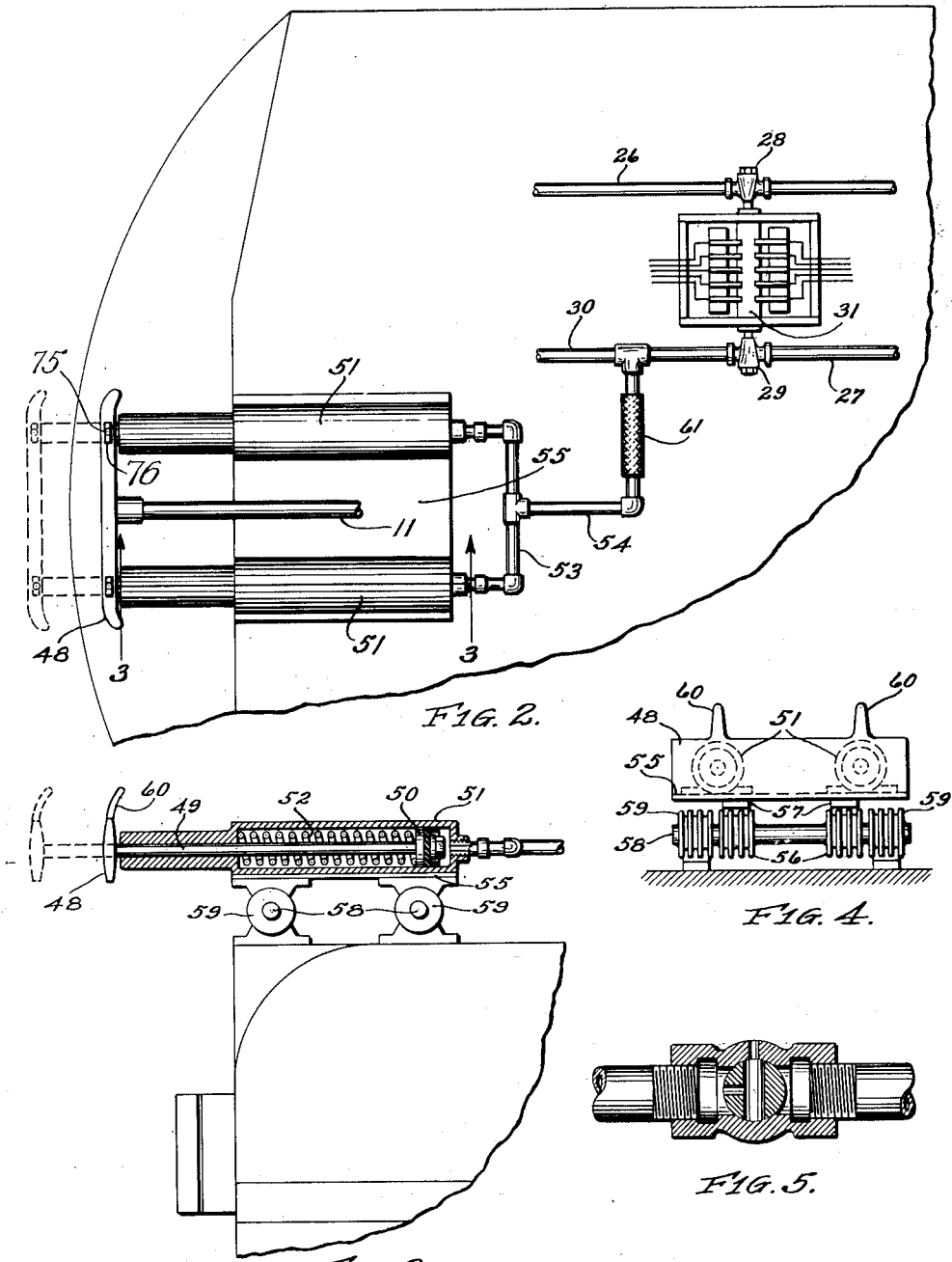

Patented May 30, 1933

1,911,251

UNITED STATES PATENT OFFICE

CHARLES H. TOMLINSON, OF MANSFIELD, OHIO, ASSIGNOR TO THE TOMLINSON COUPLER COMPANY, OF MANSFIELD, OHIO, A CORPORATION OF OHIO

MEANS FOR CONNECTING COUPLED CARS IN A TRAIN LINE CIRCUIT

Original application filed October 28, 1927, Serial No. 229,356. Divided and this application filed May 23, 1929. Serial No. 365,477.

My invention relates to cars arranged to be coupled in trains and provided with electric and pneumatic train line circuits extending from car to car.

One object of my invention is to provide means for coupling and uncoupling the bus line or power circuit from car to car and to provide means for controlling the connecting and disconnecting of the bus lines from car to car at will of the operator from a station in one car.

Another object of my invention is to automatically disconnect the bus line from car to car prior to uncoupling the cars.

Another object is to automatically prevent connecting the bus lines from car to car if the motor circuits are alive.

Other objects of my invention will appear as the description proceeds.

My invention resides in the new and novel construction, combination and relation of the various parts hereinafter described and shown in the drawings accompanying this specification. This application is a division of my application Serial Number 229,356 filed October 28, 1927; Patent No. 1,761,419.

In the drawings:—

Fig. 2 is a plan view of a bus line connector mounted on the car roof and interconnected with the pneumatic system and a cut-out switch for controlling train line circuits.

Fig. 3 is a vertical section of the bus line connector shown in Fig. 2 on the center line 3—3 of Fig. 2.

Fig. 4 is an end elevation of the connector shown in Figs. 1 and 2.

Fig. 5 is a longitudinal section of a three-way valve for controlling the connector shown in Figs. 1, 2 and 3.

Figure 1:
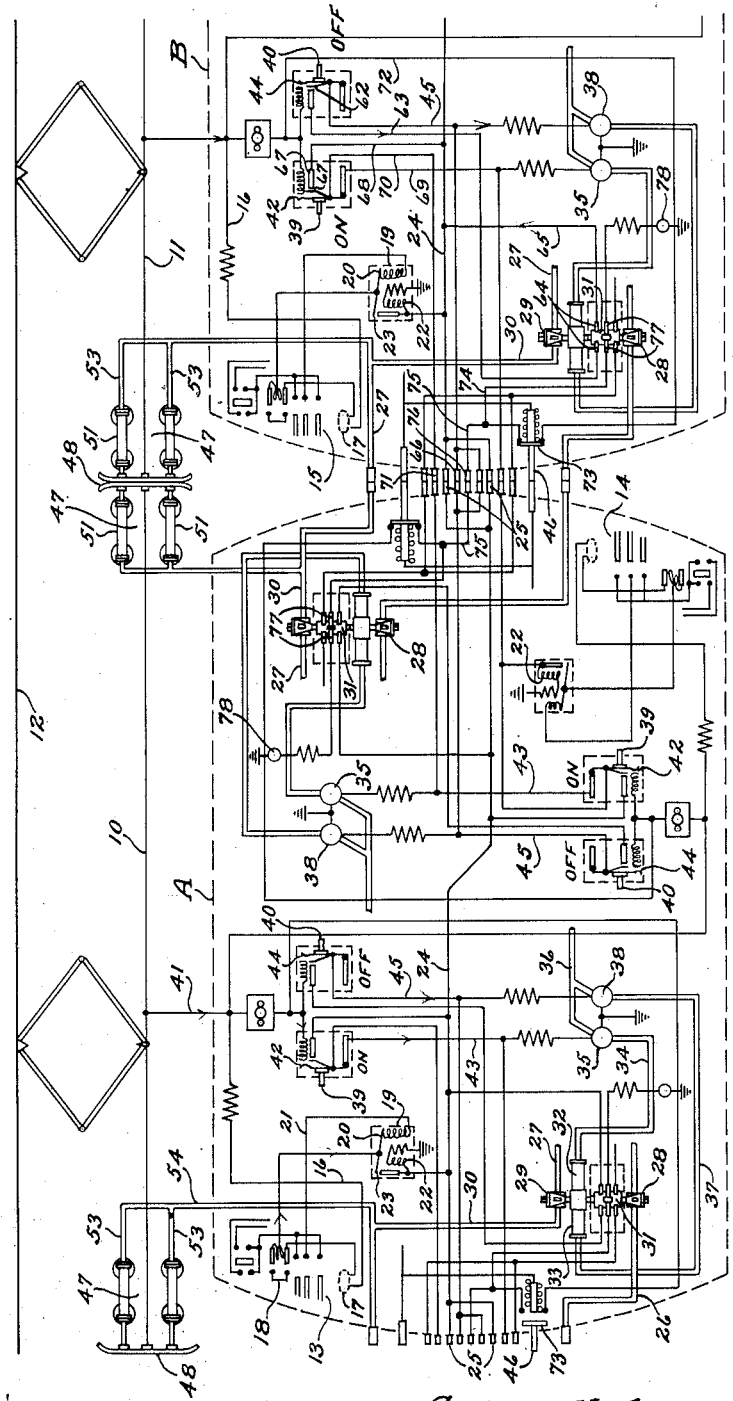
Fig. 1 is a diagrammatic view of wiring connection and association of parts showing one car and a portion of another car coupled together and equipped with one form of the present invention.

In the drawings, Fig. 1 shows two cars A and B of a train in coupled relation. Any suitable form of coupling having means for connecting electric circuits and fluid pressure lines may be employed. One suitable form of coupling mechanism is shown in my prior Patents No. 1,223,223 granted April 17th, 1917, and No. 1,402,120 granted January 3, 1922.

The cars are provided with bus lines 10 and 11 connected in any suitable way with a source of electric energy, as a trolley wire 12. Each car is equipped with two master controllers 13, 14 and 15 respectively in the drawings. Any one of these controllers may be operated for energizing the control circuit connections for the motors on all the cars of the train. The control circuits may be connected by the couplers in the manner shown in my prior patents referred to above.

It is a general practice to provide the master controllers on cars connected in multiple units, with an operating handle, commonly known as a dead man's handle. With this type of handle the operator must hold down on said handle to close a switch, usually provided with a blowout coil, to allow current to pass to the first point on the controller. The object of the dead man's handle is that if, for any reason, the operator's attention is distracted or he should be incapacitated, the removal of his hand would open the main supply circuit, which would in turn de-energize the traction motor on the car or all cars in the train, and in some systems automatically apply the brakes on the entire train.

Current for the motor control circuits may be supplied in the usual way, either from a battery or from the bus line 10. In the drawings, the bus line 10 is shown connected to the controllers through conductors 16 and magnetic blow-out coils 17. It will be noted that the conductors 16 and contacts 18 manually operated by the controller handles for connecting the energizing conductors 16 with de-energizing relay switch 19. This is the connection usually employed for car controllers. The relay switch 19 is closed at 20 during normal operation of the car so that current passes through the contacts 18 and switch 19, through the conductor 21 to the first point in the controller. The relay switch 19 is provided with the magnetic coil 22, which when energized, will open the contact 20 and close the contact 23 which connects the switch blade through the coil 22 to ground.

A de-energizing conductor 24 extends throughout the train and is provided with contacts 25 at each coupler for connecting the de-energizing wire in one car with the de-energizing wires in adjacent cars on impact of the cars.

Each car is provided with an air brake line 26 and a reservoir line 27. The brake line 26 is provided with a cock 28 and the reservoir line 27 is provided with a three-way cock 29. In one position of the three-way cock 29, continuous passage through the reservoir line is provided while in the other position, the line 27 is closed and a portion 30 beyond the three-way cock is open to atmosphere. The valves 28 and 29 are interlocked with an electric cut-out switch 31 which is pneumatically operated by pneumatically operated pistons disposed in cylinders 32 and 33. A pipe line 34 is connected through an electro-pneumatic valve 35 to a source of air pressure 36 which may be supplied from the reservoir line. The cylinder 33 is connected through a pipe 37 and an electro-pneumatic valve 38, which is also connected to the pipe 36. The construction and operation of the combined switch and air valves and the electro-pneumatic valves for controlling the same are described in my prior patents referred to above and Patents No. 1,381,852 dated June 13, 1921, and No. 1,228,719 dated June 5, 1917.

The electro-pneumatic valve 35 is controlled by a coupling button or switch 39 and the electro-pneumatic valve 38 is controlled by an uncoupling button or switch 40. The coupling and uncoupling buttons are supplied with electric energy from the bus line or other suitable source of current, a connection 41 being shown in the drawings for this purpose.

When the coupling button 39 is pressed, current passes through the contact 42 and conductor 43 to the electro-pneumatic valve 35 which opens and connects the pipe 34 to the air supply 36 and operates the switch 31 and valves 28 and 29 to close the circuits which pass through the switch 31, and at the same time to open the valves 28 and 29 so that the reservoir and brake lines of the coupled cars are connected to the couplers at that end of the car. When the uncoupling button 40 is pressed, current passes through the contact 44, through the conductor 45, to the electro-pneumatic valve 38 which operates the switch 31 and valves 28 and 29 in the other direction to open the circuits and to close the valves in the air pressure lines. This operation is more fully described in my prior patents referred to above.

The present invention refers more particularly to controlling the bus line circuits 10 and 11 which carry the power current from car to car. When cars are coupled or uncoupled, power current should be shut off from the various bus circuits to avoid arcing at the contacts. The present invention provides for the coupling and uncoupling buttons to control the de-energizing circuit for automatically de-energizing the control circuits upon operation of either the coupling or uncoupling button and thus cut off the flow of power from the bus line to the motors before coupling or uncoupling of the bus line contacts is effected on all cars by an operator at a station in one car.

As is well known by those skilled in the art, each car is provided with what is termed a multiple unit switch group generally mounted underneath the car body which, when energized through operation of the master controller in any one car, allows the notching up of these switch groups in all cars to supply current to the motors through the proper resistance, which is the common method in all multiple unit control systems.

My present invention is particularly adapted for controlling bus lines between connected cars where the voltage is greater than that generally used, namely 600 volts. For such higher voltage, such as 1,000 volts and upward, I use the form of connector shown at 47 of Fig. 1 and more completely illustrated in Figs. 2, 3 and 4. The connector consists of a contact bar 48 supported by plunger rods 49 connected with pistons 50 arranged to move in cylinders 51. The bus line cables 10 and 11 are connected to the contacts 48 of the respective cars A and B. The contact bars 48 are normally held in retracted position by springs 52 and are projected into contact with complementary contact parts by air pressure introduced into the cylinders 51 in the rear of the pistons 50 through air pipe lines 53. The air pipe lines 53 are connected by a line 54 with a portion of the reservoir line 30 located beyond the three-way cock 29. The cylinders 51 are mounted on a platform 55 located on top of the car and supported by insulators 56. The insulators 56 are provided with base portions 57 which support the platform 55 and with sleeve portions which surround the supporting rod 58.

Insulators 59 are mounted on the car roof and are provided with sleeve portions which support the rod 58. In this way double insulation is provided for the platforms 55. The contact bars 48 are provided with one or more arcing horns 60. The air line connection 53 is provided with a flexible insulating section 61.

When the switch 31 is rotated to "off" position by the operation of the uncoupling button 40, the valves 28 and 29 will be closed but the three-way valve 29 will open the line 30 to atmosphere, thus air will be exhausted from the pipes 53 and the cylinders 51 so that the contacts 48 will be retracted by atmosphere by springs 52. When two cars are coupled and the switch 31 is changed to its position, the air pressure in the reservoir pipe 27 will be transmitted to the cylinders 51 and the contacts 48 will be moved and held in their forward contacting position by the air pressure acting on the pistons 50.

If, while the cars and parts are in the coupled relation, the operator in car B wishes to uncouple from car A, he will press his uncoupling button 40. This will close the connection 44 and at the same time will close a supplemental contact 62. Current will then flow from the bus line 11, through the conductor 63, the contacts 64 of the switch 31 and the conductor 65 to the de-energizing line 24. From the de-energizing line 24 current will now flow through the solenoids 22 in the energizing relay switch 19 and all of the cars in the train, opening the contacts 20 and closing the contacts 23.

Any current flowing through the supply 16 to the controllers 13, 14 and 15 will now be cut off from the controllers since the contacts 20 are open, and will pass through the contacts 23 and the holding coil 22 to ground. This will cut off current from the control circuits and open all the motor switches, thereby cutting off all power to the traction motors prior to the retraction of the bus connectors and thus decreasing current in the bus line to that necessary only for lights and operation of the air compressors in the different cars. Such current would be relatively small and would produce no serious effect on separation of the bus line contacts 47 on the roof as any arcing would tend to following the arcing horns.

In the form of the invention shown in Fig. 1, the de-energizing switch 19 is in series with the switch 18 of the dead man's handle so that the operation of the de-energizing switch has the same effect as releasing the dead man's handle, however, the de-energizing switch can be installed on any type of controller whether it has a dead man's handle or not, just so it is interpositioned in the circuit between the first and second positions of the controller.

Pressing the uncoupling button 40 and closing the contact 44 also supplies current through conductors 5 to the electro-pneumatic valve 38 in car B which operates the switch 31 and the cocks 28 and 29 to close the air lines and open the electric circuits. This will open the circuit from the bus line contact 46 and the release of the pressure in the part 30 of the reservoir line will release the pressure in the cylinders in the switch 31 on the adjacent ends of both coupled cars so that the springs 52 will operate the contacts 48. The de-energizing relay switch 19 will operate more rapidly than the mechanically moving parts necessary for effecting the movement of the switch 31 so that before the control circuits are opened, the parts controlled by the de-energizing circuit will have had time to open the motor switches. At the time the bus line circuits are opened therefore, no current will be flowing to the motors for driving the cars.

It will be noted that conductors 45 in adjacent cars are connected through contacts 66 so that the uncoupling electro-pneumatic valves 38 will be simultaneously operated in each of the cars when the uncoupling button is pressed in either car. It should be noted also that the connection between the uncoupling button and de-energizing circuit passes through the drum switch 31. This mechanically breaks connection between the source of power and the de-energizing circuit at the time the switch is operated, whether the cars have been operated or not. If the connections were not broken and the uncoupling button was held in depressed position, it would be impossible for the operator in car A to supply current to his motors to draw the cars apart as the de-energizing relay 19 in car A would continue to be de-energized, thereby preventing the energization of the conductor 16 to the master controller 14.

After the supply of current to the de-energizing switch has been broken by the switch 31, the operator in car A, by throwing his control handle to the "off" position, cuts off all current through the supply circuits so that the mechanically operated switch coil 22 is de-energized and the contact 20 is again permitted to close so that the operator in car A may supply current to his motors to draw away from car B, although the operator in car B continues to hold his uncoupling button depressed. The mechanical couplers for the cars are automatically released by the depression of the uncoupling button after the switch 31 is operated in the manner explained in my prior Patent No. 1,223,223, and it is necessary, to mechanically uncouple the cars, for the operator in car B to hold the uncoupling button down until the cars have moved apart, otherwise they would return to coupled relation.

When two cars are to be coupled when moving, the operators in the two cars ordinarily have their controllers in different positions so that if their circuits were permitted to connect with the controllers in different operating positions, the control circuits would be crossed and damage might be done. The present invention de-energizes the control circuits and requires the switches 31 to be open before they can be coupled and makes it necessary for both operators to move the controller handles to "off" position before either one can again supply current to the motors. Before the cars are coupled, the switches 31 in the adjacent ends of the car will, as stated, be in open position and the valves 28 and 29 will be closed, and the contact 38 will be retracted. On impact of the cars, mechanical coupling of the cars and electric circuits will be automatically effected but it is necessary for the operator in one car or the other of two adjacent ends to press his coupling button 39 to establish the continuity of the train line circuits.

Assuming that the operator in car B presses his button 39, this will close the contacts 42 and 67 so that current will flow through the conductor 68 to the de-energizing circuit 24 and operate the de-energizing switches 19 throughout the train, cutting off the power current to the motors. It is noted that the de-energizing circuit does not pass through the drum switches but connection is made between the de-energizing circuits of two cars on impact of the cars. The current from the uncoupling switch to the de-energizing circuit is interrupted by the drum switch, but not from the coupling switch.

When the coupling button is depressed, current also flows through a conductor 69 to the electro-pneumatic valve 35 to throw the switch 31 into coupled position. Current also flows through a conductor 70 and a connector 71 to the electro-pneumatic valve 35 in the adjacent end of car A to operate the switch 31 in that car. Pressing the coupling button, therefore, first de-energizes all master controllers causing the power current to be shut off from the traction motor, and thereafter operates the switches 31 for connecting the electric circuits including the bus line connectors 47 and opens the valves 28 and 29 of the brake system.

It will be noted from Fig. 2 that the contact member 48 is pivoted to the bars 49 by pivot pins 75 operating in elongated slots 76. This will permit the bars 49 to be extended different distances from the cylinders 51 so that the bar 48 will assume an oblique angular position relative to the axis of the car. This permits the cars to assume an angle to each other in passing about curves in a track, as shown in Fig. 6.

The bars 48 may also slide relative to each other to permit lateral displacement of the cars. A combination of these two movements takes place at times, as illustrated in Fig. 7. The fact that the bar 49 may move into and out of the cylinders independently of each other and that the bars 48 are pivoted on the ends of the bars 49, permits the cars to assume any relative position required in their operation.

I claim:—

1. The combination with electrically driven cars in a train, of bus lines for said cars, means for connecting and disconnecting bus lines of adjacent cars in a train, a fluid pressure train line, a valve for opening and closing said fluid pressure train line, electro-pneumatic means for controlling said valve, means for connecting said train line with said connecting and disconnecting means to connect said bus lines when said valve is open, and spring means for effecting disconnection of said bus lines when said valve is closed.

2. The combination with electrically driven cars forming a train, of a bus line for each of said cars, bus line connectors mounted on the tops of said cars in position to engage similar bus line connectors on adjacent cars in the train comprising a contact member movable into and out of engagement with a similar contact on the adjacent cars, operating means to move said contacts into engagement and other means to move the contacts out of engagement, insulating means interposed between the said connectors and the car and piping connecting said operating means to a source of air supply, insulated means interposed in said piping between the connector and the source of air supply to break the electrical continuity of the piping and manually operated means to control the supply of air to the said operating means at will of an operator.

3. The combination with an electrical car, of a contact member projecting from said car, a movable support for said contact member and means adapted to cause said support to move in the direction of its axis relative to said car, said contact member beng pivotally mounted on said support to permit the contact face thereof to assume different angles relative to the axis of said support.

4. The combination with a car, of a pair of plungers projecting from the end of said car and independently movable in the direction of their axes relative to said car, and an electrical contact member having pivotal connection with each of said plungers.

5. The combination with a car, of a pair of plungers mounted on said car and having independent movement relative to said car in the direction of the axis of said car, and an electrical contact bar pivotally mounted on said plungers and assuming different angles relative to the face of said car depending upon the relative position of said plungers.

6. The combination with a pair of cars in a train, of electrical contact bars supported on said cars respectively and engaging each other, said contact bars being slidable on each other transversely of the axes of said cars and spaced pivotal supports for opposite ends of each bar, said supports being movably mounted on said cars to permit engagement of the contact faces of said bars when the axes of said cars are disposed at an oblique angle to each other.

7. In combination, a pair of cars in a train, an electrical contact member mounted on the roof of each car and comprising a contact bar, spaced plungers pivotally connected at their respective ends with said bar, said plungers being movable independently of each other in the direction of the axes of the respective cars, and means for projecting and retracting said plungers to move said contact bars into and out of electrical connection.

8. The combination with a car, of an electrical contact bar mounted on said car, spaced plungers pivotally connected with said contact bar and movable independently of each other, and electro-pneumatically controlled means for projecting and retracting said plungers.

9. The combination with a pair of coupled cars having limited longitudinal and transverse movement relative to each other, of electrical contact members mounted on the roofs of said respective cars, pneumatically and spring actuated means for advancing and retracting the contact members on said respective cars into and out of electrical engagement with each other, said contact members being movable with their respective cars vertically and laterally relative to each other when in contact, said pneumatic and spring actuated means operating to retain said contact members in engagement with each other irrespective of the relative movement of said cars.

10. The combination with a pair of cars having limited longitudinal and transverse movement relative to each other when coupled, bus lines on said cars, bus line connectors on the roofs of said respective cars for connecting said bus lines from car to car, said bus line connectors having electrical contact members movable with their respective cars vertically and laterally relative to each other when in contact, pneumatically and spring actuated means for advancing and retracting said contact members into and out of engagement with each other to open and close the bus line circuit, said pneumatically and spring actuated means operating to hold said contacts in engagement irrespective of the relative movement of said cars, and electrical means for controlling the pneumatic operation of said connectors.

11. The combination with a pair of cars having limited vertical, lateral and angular movement relative to each other, of bus lines on said cars, bus line connectors on said cars having contact supports movable in the longitudinal direction of the respective cars, a contact member mounted on the contact support on each car, said contact members adapted to engage each other to connect said bus lines from car to car, and yielding means for holding said supports in projected position to maintain said contact members in engagement irrespective of the relative movement of said cars, said contact members being pivotally mounted on their respective supports to permit said members to maintain effective engagement, notwithstanding relative angular movement of the cars.

12. The combination with a pair of coupled cars having bus line circuits, of bus line connectors mounted on the tops of said cars for connecting said circuits, said bus line connectors each comprising a plunger, pneumatic means for projecting said plunger toward the plunger of the connected car and for yieldingly holding said plunger in its projected position and a contact member pivotally mounted on said plunger in position to engage a like contact member on the connected car, said contact members having engaging faces free to slide on each other vertically and laterally when in contact to accommodate themselves to relative vertical and lateral movement of the cars, the pivotal mounting of said contact members permitting said faces to remain in contact when said cars are in an angular position relative to each other while passing about a curve.

13. The combination with two coupled cars having bus line circuits, of connectors for said circuits mounted on the tops of said cars respectively, each connector comprising a plunger having a contact member pivotally mounted thereon for angular movement relative to the axis of the plunger, yielding means for projecting said plunger to move its contact member into engagement with the contact member on the coupled car and to hold said contact members yieldingly in engagement with each other, said contact members being movable relative to each other vertically and laterally while in engagement to accommodate relative vertical and lateral movement of the connected cars, the pivotal connection of said contact members with their respective plungers enabling said contact members to maintain engagement over an extended surface when said cars are displaced angularly relative to each other.

14. The combination with coupled cars in a train, each having a bus line conductor, of bus line connectors for said conductors mounted on the tops of said cars, said bus line connectors each having a plunger provided with a contact plate mounted on the end thereof for engaging the contact plate of the cooperating connector, yielding means for projecting said plungers to bring said contact plates into engagement with each other and for holding said contact plates in engagement notwithstanding limited relative movement of said cars toward and away from each other, each of said contact plates being pivotally mounted on its plunger to permit the contact faces of said plates to remain in engagement when said cars are displaced angularly relative to each other, the contact faces of said plates being slideable on each other both vertically and laterally to accommodate relative vertical and lateral movement of said cars.

In testimony whereof I affix my signature.

CHARLES H. TOMLINSON.